Aug. 3, 1954
A. R. MURRAY, JR
2,685,432
METALLIC PICKET FENCE
Filed March 7, 1946
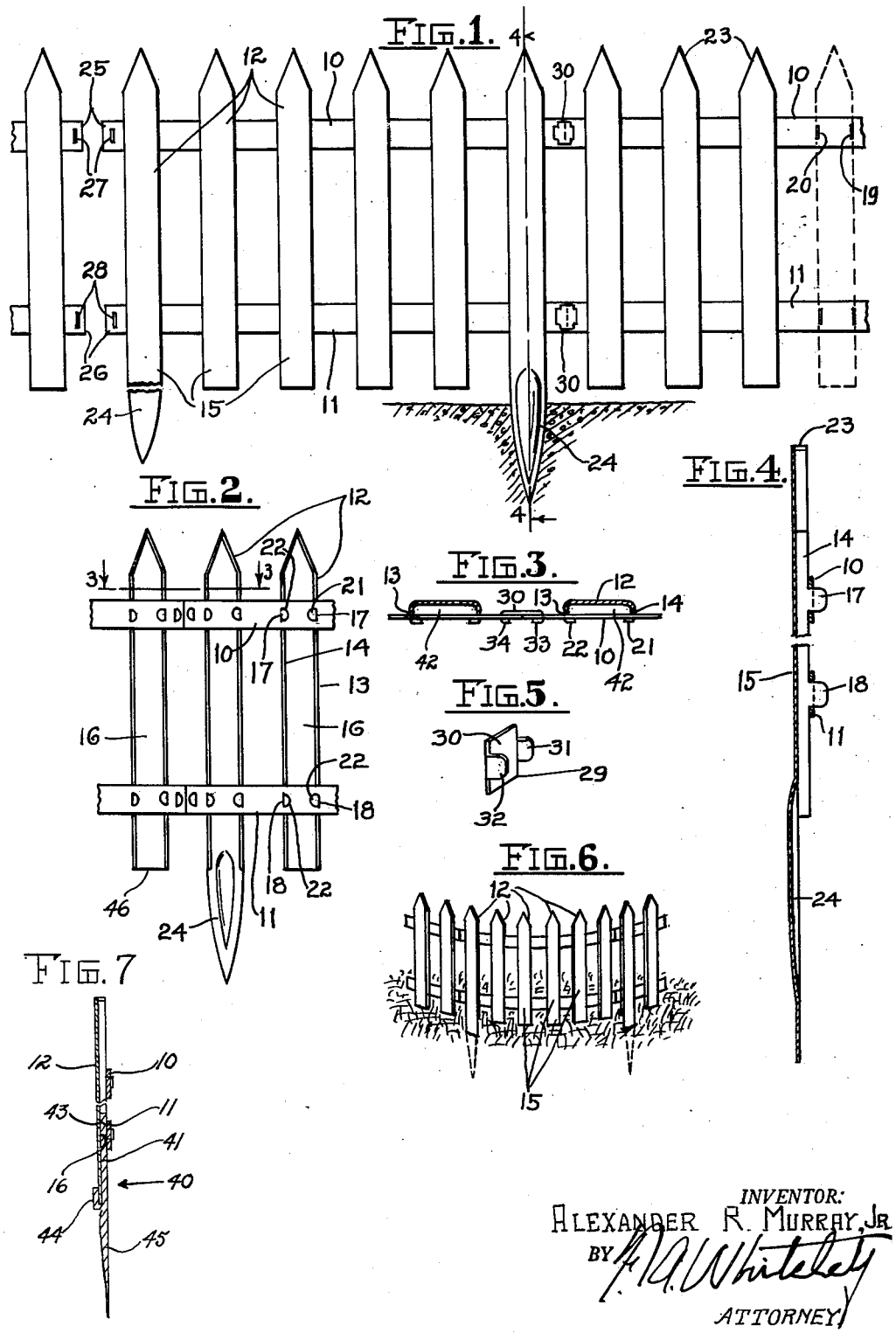
INVENTOR:
ALEXANDER R. MURRAY, JR
BY
ATTORNEY Patented Aug. 3, 1954

2,685,432

UNITED STATES PATENT OFFICE 2,685,432

METALLIC PICKET FENCE

Alexander R. Murray, Jr., Minneapolis, Minn.;
Rose I. Murray, Hennepin County, Minn., executrix of said Alexander R. Murray, Jr., deceased Application March 7, 1946, Serial No. 652,533

2 Claims. (Cl. 256—22)

My invention relates to a metallic structure for protecting plants, flower beds, trees and the like and has for its object to provide an all metal structure, analogous to a picket fence, preferably of relatively short height, although applicable to fences of any height, wherein the picket members are rigidly held to flexible transverse members, the whole being assembled in sections, with certain picket members having extensions for insertion in the ground, and with means for connecting the several ends of the sections together for any desired purpose such for example as to surround individual flower plants, to surround flower beds, to surround trees and the like.

Protective structures such as herein referred to have been employed, being usually wooden pickets with wire or strip means for holding them together and being generally assembled in full length at the factory and marketed in continuous rolls.

But heretofore no effective and reasonably economical means has been devised for holding metal pickets upon flexible supporting strips, or upon metal strips, or for effectively connecting together sections of such picket fences so held. Furthermore, the cost of metal protective devices, where obtainable at all, has heretofore been so great as to be in effect prohibitive.

It is a principal object of my invention, therefore, to construct a protective device for plants, trees and the like which shall comprise sections embodying two or more longitudinal flexible strips of metal to which are secured a multiplicity of light metal pickets in the form of channels, the channels' edges being adjacent the metal strips and being directly secured thereto.

It is a further object of my invention to form the picket members from light, flexible, yet springy metal, with side walls or flanges extending from a face of the strips at right angles thereto, and to secure the edges of the flanges directly in contact with and to the flexible longitudinal strips.

It is a further object of my invention, in forming the pickets' flanges, to provide integral extensions of said picket flanges in the form of ears, and to form in the longitudinal members corresponding slots, so the ears of the picket flanges may be inserted through the slots of the longitudinal members and be turned down thereon to produce an integrated union of the flexible strips and the several pickets, which, while very light, by this form of union are made sufficiently strong and durable for all uses for which the protective strips may be employed.

It is a further object of my invention to make up sections of such protective members with a limited number of pickets, for example 6 of such pickets, as shown, and to attach the ends of the sections together, to produce a continuous extent of the protective member sufficient to encircle any plant, tree, object, flower bed or the like.

It is a further object of my invention to make one or more of the picket members of each of said sections with an extended part, pointed at the end and adapted to be thrust into the ground, so as to give ground support to the protective member when it is placed in position about a plant, tree, bed or the like, said extensions being either integral with or attached to certain of the pickets.

The full objects and advantages of my invention will appear in connection with the detailed description thereof given hereinafter in the appended specification and the novel features of my invention by which the aforesaid advantageous results are secured will be particularly pointed out in the claims.

In the drawings illustrating an application of my invention in one of its forms:

Fig. 1 illustrates my metallic protecting structure held in position on the ground with parts broken and with the joints of several sections displayed.

Fig. 2 is a view of a pair of joined sections taken from the opposite side of the view of Fig. 1.

Fig. 3 is an enlarged sectional plan view taken on line 3—3 of Fig. 2.

Fig. 4 is an enlarged sectional elevation view with parts broken taken on line 4—4 of Fig. 1.

Fig. 5 illustrates in perspective one of the members for fastening two sections of the metallic structure together at the ends of their flexible strips.

Fig. 6 illustrates on a reduced scale the metallic protective structure in position relative to a bed of plants.

Fig. 7 is a longitudinal sectional view on a reduced scale with parts broken of a ground-engaging spade member similar to the extension 24, which is adapted to be secured to any picket member.

As illustrated, and considering one of the sections only of Figs. 1 and 2, my invention comprises a pair of metallic strip members 10 and 11 which extend in a parallel relation suitably spaced apart and to which are secured a multiplicity—6 as shown—of picket-like members 12. These members have front faces 15, Fig. 1, and rear faces 16, Fig. 2. At the edges of the rear faces 16 are formed parallel flanges 13 and 14 extending at right angles to the inner face 16 of the members 12.

Upon the flanges 13 and 14 are formed integral metallic ears 17 and 18 shown unbent in Fig. 4. The flexible strips 10 and 11 are provided with slot-like openings 19 and 20 spaced apart a distance equal to the distance between the ears 17 and 18 on the flanges 13 and 14, to receive these ears.

These flanges are shown in Fig. 2 as at 21 and 22 upon the outer face of the strips 10 and 11, thus drawing the edges of flanges 13 and 14 tight across the inner face of the flexible strips 10 and 11. In this manner the picket members 12 are held to the flexible strips 10 and 11 so the structure when set in the ground is very rigid vertically and readily lends itself to being curved around the objects to be protected, such as plants, flower beds, trees and the like.

The picket members 12 together with the flanges 13 and 14 are brought to a point at 23 so that the completed protective structure is not only rigid but when covered with enamel paint is highly ornamental.

As shown, each section may include pickets of which the two outer pickets may be formed with a spadelike extension 24, which is adapted to be thrust into the ground to hold the member in position. As shown in Fig. 1, for one section there is such an extension 24 for each end picket.

But I do not wish to limit myself to using these extension parts on the end pickets only, or on both end pickets, as it may be practical and desirable under certain circumstances to have the extensions otherwise positioned or to have only one extension on each section as indicated in Fig. 2.

A modified ground-entering spade member, which under many conditions of use may be more desirable than to have the ground-entering part an actual portion of the picket is shown in Fig. 7. In this form a separate ground-entering member 40 is provided with a shaft portion 41, adapted to be inserted into an opening 42, Fig. 3, formed between side flanges 13 and 14 of a picket 12 and in front of the strip member 11.

This shaft will have a portion 43 which engages the inner wall 16 of the picket and comes under the strip 11. A clamping member 44 on the shaft portion 41, which is preferably rectangular in cross section, is secured to the lower part of said shaft which is above the spade part 45, and which receives the lower edge 46 of the picket member to prevent any twisting and in fact uniting the extension member 40 and the picket member 12.

It will be noted that the strips 10 and 11 respectively have their ends extended as indicated at 25 and 26 on Fig. 1 and that the extended ends are provided with transverse slots 27 and 28. These slots are adapted to receive fastener members 29, Fig. 5. These fastener members comprise a central body portion 30 and ears 31 and 32, in all respects similar to the ears 21 and 22.

As shown in Fig. 3, for fastening the sections together, the ears 31 and 32 are pushed through the slots 27 and 29 and are turned over at 33 and 34 upon the inner faces of flexible strips 10 and 11 in exactly the same manner that the ears 17 and 18 on the pickets are turned over upon the inner faces of the strips 10 and 11.

The above described device is a very efficient and also slightly means of securing sections together. But I do not wish to be limited to these securing means, as other means such as bolts, plate fasteners, set screws and the like may be employed.

By this or other suitable means the sections of fence or metal protective structure are secured together for any desired length and the resulting structure is the same as it would be if it were made absolutely integral, and it has both the characteristics of flexibility for curving and those of easy connection for each of the sections, and of easy erection for use.

The advantages of my invention clearly appear from the description in the specification and the showing in the drawings, as above outlined. The primary advantage is, that with the use of very light metal and at extremely low cost, a protective all-metal structure is provided which may be employed for any purpose where it is desirable to surround an object to be protected by such a protective structure, which is in the nature of a form of ornamental picket fence.

A particular advantage of the invention comes from the simple manner by which this metal structure is united together, that is the manner in which the pickets are secured to the flexible strips. This method of uniting the pickets from flanges integrally formed thereon, by ears integral with the flanges which extend through slots formed transversely of the body of the strips, produces a firm unyielding union of the picket members to the strips which enables the flexibility of the strips to be employed for moving the entire arrangement into an encircling position, and at the same time makes an exceptionally rigid and strong structure in proportion to the weight of metal used.

A further great advantage resides in the manner in which the protective structure is formed in sections, each section adapted to be supported in the ground and the sections having means for uniting them at their ends, thus providing means for putting together and creating a protective structure of any required length, without any necessity of putting the entire structure into rolls at the factory.

The construction shown in Fig. 7, in which the ground entering portion is independent of the pickets and may be set in any picket wherever desired, also is a marked advantage of my invention, particularly because with this arrangement all of the picket members may be made identically the same. And the distances between the ground entering spade members may be varied as desired or as the particular enclosure being constructed may require.

I claim:

1. A fence structure embodying a longitudinally extending member, said member being formed with spaced-apart apertures therein, a plurality of pickets for mounting on said member, each of said pickets being formed with a flat face and marginal flanges extending at right angles from the face of the picket, and fastening means carried by each of said pickets for securing the same on the longitudinal member consisting of ears extending in prolongation of the marginal flanges, said ears being adapted for passage through the apertures in said member and formed to be angularly bent on the opposite side of said member.

2. A fence structure embodying a pair of spaced longitudinally extending members, said members being formed with spaced-apart apertures therein, a plurality of pickets for mounting on said members, each of said pickets being formed with a flat face and marginal flanges extending at right angles from the face of the picket, fastening means carried by each of said pickets for securing the same on said longitudinal members consisting of ears extending in prolongation of the marginal flanges, said ears being adapted for passage through the apertures in said members and formed to be angularly bent on the opposite side of said members, and a spade-like attachment for insertion in the ground carried by one of said pickets.

References Cited in the file of this patent

UNITED STATES PATENTS

| Number | Name | Date |
| --- | --- | --- |
| Re. 7,562 | Miller | Mar. 20, 1877 |
| 144,641 | Taylor | Nov. 18, 1873 |
| 195,723 | Nellis | Oct. 2, 1877 |
| 213,859 | Atkinson | Apr. 1, 1879 |
| 303,126 | Cordtz | Aug. 5, 1884 |
| 742,431 | Hooper | Oct. 27, 1903 |
| 1,228,062 | Scofield | May 29, 1917 |
| 1,668,651 | McKinnon | May 8, 1928 |
| 2,295,271 | Schuck | May 7, 1940 |